United States Patent
Bell et al.

(10) Patent No.: US 10,048,996 B1
(45) Date of Patent: Aug. 14, 2018

(54) PREDICTING INFRASTRUCTURE FAILURES IN A DATA CENTER FOR HOSTED SERVICE MITIGATION ACTIONS

(71) Applicant: Amazon Technologies, Inc., Seattle, WA (US)

(72) Inventors: Charles H. Bell, Seattle, WA (US); Joseph Thomas Minarik, Sammamish, WA (US)

(73) Assignee: Amazon Technologies, Inc., Seattle, WA (US)

( * ) Notice: Subject to any disclaimer, the term of this patent is extended or adjusted under 35 U.S.C. 154(b) by 98 days.

(21) Appl. No.: 14/869,910

(22) Filed: Sep. 29, 2015

(51) Int. Cl.
*G06F 11/00* (2006.01)
*G06F 11/07* (2006.01)

(52) U.S. Cl.
CPC ........ *G06F 11/079* (2013.01); *G06F 11/0709* (2013.01); *G06F 11/0751* (2013.01); *G06F 11/0772* (2013.01)

(58) Field of Classification Search
CPC . H04L 12/12; H04L 41/0631; H04L 43/0811; H04L 43/0817; G06F 11/008; G06F 11/14; G06F 11/1469; G06F 2201/86
See application file for complete search history.

(56) References Cited

U.S. PATENT DOCUMENTS

| | | | | |
|---|---|---|---|---|
| 8,601,287 B1 * | 12/2013 | Weber | .................... | G06F 1/3206 702/186 |
| 8,707,107 B1 * | 4/2014 | Panna | .................... | G06F 11/008 714/1 |
| 8,995,249 B1 | 3/2015 | Roy et al. | | |
| 2002/0091972 A1 * | 7/2002 | Harris | .................... | G06F 11/008 714/47.2 |
| 2003/0016462 A1 * | 1/2003 | Gong | .................... | G11B 5/59611 360/31 |

(Continued)

FOREIGN PATENT DOCUMENTS

WO      2014062557      4/2014

OTHER PUBLICATIONS

Dubey, "Towards a verifiable real-time, autonomic, fault mitigation framework for large scale real-time systems" Sep. 15, 2006, Springer, p. 1-20.*

(Continued)

*Primary Examiner* — Bryce P Bonzo
*Assistant Examiner* — Jeison C Arcos
(74) *Attorney, Agent, or Firm* — Robert C. Kowert; Meyertons, Hood, Kivlin, Kowert & Goetzel, P.C.

(57) ABSTRACT

A data center may predict infrastructure failures in order to perform mitigation actions at services hosted at the data center. Operational metrics for different infrastructure systems of a data center may be collected and analyzed to generate failure models. The failure models may be evaluated to predict infrastructure failure events. The predicted infrastructure failure events may be programmatically provided to the services. The services may evaluate the prediction and select mitigation actions to perform. For data centers implemented as part of a provider network with services hosted across multiple data centers, mitigation actions may be performed at multiple data centers for a service in response to a predicted failure event at one data center.

20 Claims, 9 Drawing Sheets

(56) References Cited

U.S. PATENT DOCUMENTS

| | | | |
|---|---|---|---|
| 2003/0065748 A1* | 4/2003 | Fuyuno | G06F 17/30442 709/219 |
| 2003/0159058 A1* | 8/2003 | Eguchi | G06F 3/0622 713/193 |
| 2003/0216888 A1* | 11/2003 | Ridolfo | G05B 23/0283 702/181 |
| 2004/0172577 A1* | 9/2004 | Tan | G06F 11/1446 714/13 |
| 2005/0240813 A1* | 10/2005 | Okada | G06F 11/1469 714/14 |
| 2006/0230149 A1* | 10/2006 | Jackson | G06F 9/5027 709/226 |
| 2007/0220303 A1* | 9/2007 | Kimura | G06F 11/0709 714/4.11 |
| 2007/0220308 A1* | 9/2007 | Yeung | G06F 11/1469 714/5.1 |
| 2008/0141072 A1* | 6/2008 | Kalgren | G01D 3/08 714/33 |
| 2008/0177613 A1 | 7/2008 | Chan et al. | |
| 2009/0002148 A1* | 1/2009 | Horvitz | G06Q 10/047 340/514 |
| 2010/0049494 A1 | 2/2010 | Radibratovic et al. | |
| 2011/0055620 A1* | 3/2011 | Sengupta | G06F 17/30011 714/2 |
| 2011/0185268 A1* | 7/2011 | Matsushige | G06F 11/0757 714/819 |
| 2011/0258248 A1* | 10/2011 | Jackson | H04L 67/1008 709/202 |
| 2012/0041569 A1 | 2/2012 | Zhang et al. | |
| 2012/0151272 A1* | 6/2012 | Behrendt | G06F 9/542 714/39 |
| 2012/0226948 A1* | 9/2012 | Itogawa | G06F 11/008 714/47.3 |
| 2013/0073245 A1 | 3/2013 | Bhagwat et al. | |
| 2013/0312006 A1* | 11/2013 | Hardman | H04L 67/1008 718/105 |
| 2014/0136879 A1* | 5/2014 | Sashida | H04B 1/74 714/4.11 |
| 2014/0362682 A1* | 12/2014 | Guichard | H04L 41/5038 370/221 |
| 2015/0074367 A1* | 3/2015 | Cher | G06F 11/008 711/165 |
| 2015/0120636 A1 | 4/2015 | Gao | |
| 2016/0110653 A1* | 4/2016 | Foley | G06N 7/005 706/12 |
| 2016/0116375 A1* | 4/2016 | Yamada | G03G 15/5079 702/34 |

OTHER PUBLICATIONS

U.S. Appl. No. 14/020,499, filed Sep. 6, 2013, Huyen Van Nguyen.

* cited by examiner

US 10,048,996 B1

PREDICTING INFRASTRUCTURE FAILURES IN A DATA CENTER FOR HOSTED SERVICE MITIGATION ACTIONS

BACKGROUND

Organizations such as on-line retailers, Internet service providers, search providers, financial institutions, universities, and other computing-intensive organizations often conduct computer operations or services from large scale computing facilities. Such computing facilities house a large amount of server, network, and computer equipment to process, store, and exchange data as needed to carry out an organization's operations. Typically, a computer room of a computing facility includes many server racks. Each server rack, in turn, includes many servers and associated computer equipment. In addition to the computing and networking infrastructure mentioned above, other infrastructure resources, such as power and environmental controls at computing facilities, may be managed to accommodate the computing and networking infrastructure.

Infrastructure resources are managed, often independently, by different infrastructure management systems. Infrastructure management systems may collect large amounts of operational data in order to monitor the health and ensure expected performance of infrastructure resources. Power management systems, for instance, evaluate the characteristics of different power supplies in order to select the appropriate power source in different scenarios. When infrastructure failures do occur, the infrastructure management systems make response determinations and proceed accordingly (perhaps with manual input). Services and other computing operations hosted at computing facilities, however, may be unaware of the likelihood of infrastructures and thus may be unable to respond effectively.

Figure 1:
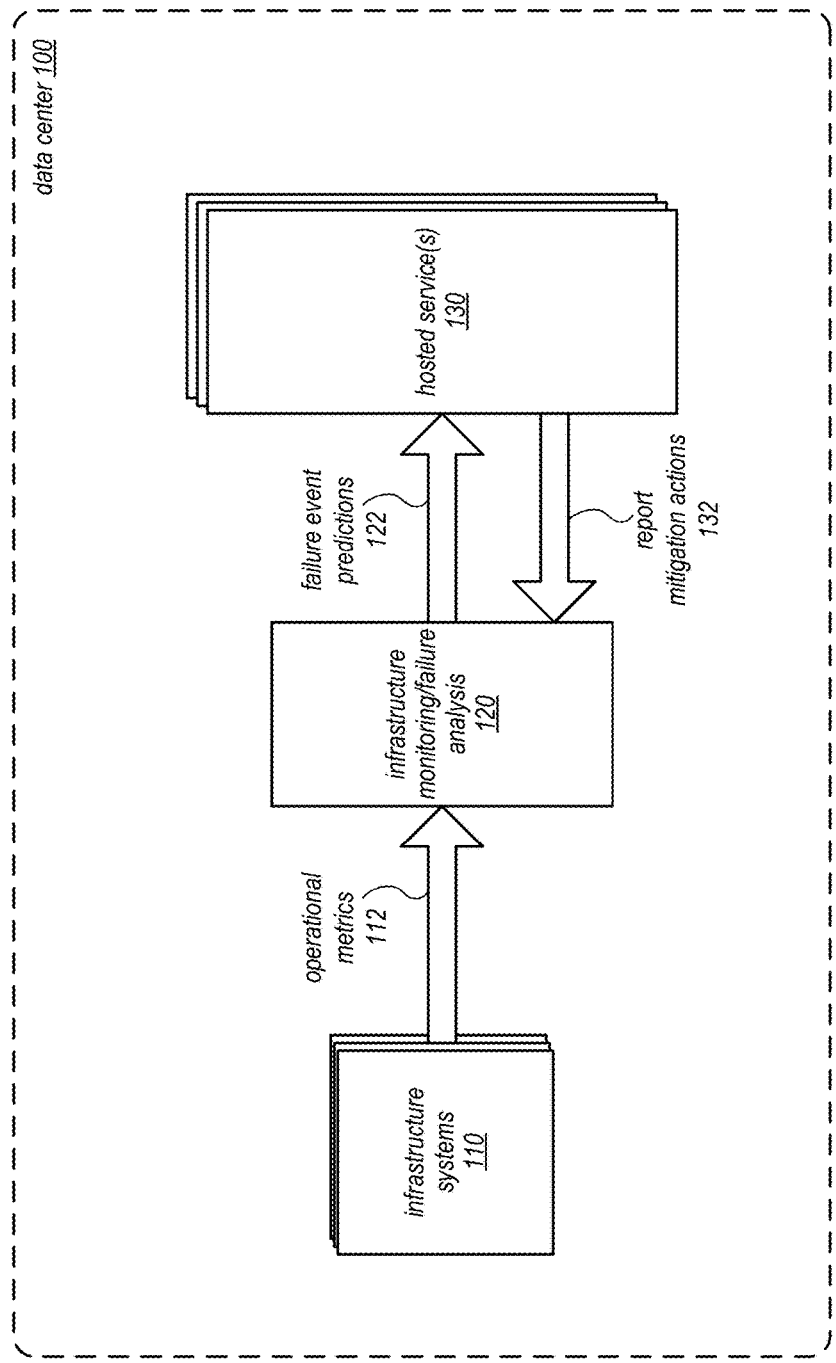
FIG. 1 illustrates a data flow diagram for predicting infrastructure failures in a data center for hosted service mitigation actions, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

The systems and methods described herein may implement predicting infrastructure failure events for a data center for hosted service mitigation actions. Data centers may include any facility or portion of a facility in which computer operations are carried out. A data center may include servers and other infrastructure systems and components that host computing operations. Many data centers host multiple computing operations or services for performing or implementing different systems, applications and/or functions. Provider networks, for instance, may offer multiple different services to clients utilizing one or more multiple data centers to host the offered services.

With increasing levels of sophistication, services may operate in dynamic fashion to react to the changing demands on a service. Load balancers, for instance, may be implemented by services to ensure that traffic directed to a service is evenly balanced across service resources, such as request handlers implemented at different servers, in order to prevent overload failures. Services may also replicate data, migrate data, reconfigure service resources, or perform other operations to react to different workloads or failures. While services may have limited insight into the performance of portions of hardware that directly hosts a resource, the circumstances of the data center and physical infrastructure systems upon which these services rely are typically hidden from the services. When infrastructure failures strike, services have to reactively respond, often relying upon manual intervention from service and data center operators to discover the failure, identify mitigations actions, and execute the identified mitigation actions.

In various embodiments, infrastructure monitoring may be implemented that predicts possible or likely infrastructure failure events that may occur at a data center so that services are not caught unawares. In some embodiments, services may automatically and programmatically evaluate the potential impact of infrastructure failure events, such as device failures, environmental failures, network failures, or power failures, identify and select mitigation actions, and perform mitigation actions in order to dynamically and proactively respond to changing conditions of the data center. Services may also report the mitigation actions performed to infrastructure monitoring in order to provide feedback that may be incorporated into future predictions of infrastructure failure events. In this way, services may experience less down time, reduced burden to perform mitigation actions, and fewer manual interventions to handle infrastructure failure events. Moreover, services can train predictive techniques to identify errors and possible mitigation actions at infrastructure monitoring so that future infrastructure failure events are predicted more accurately and/or mitigated more effectively.

FIG. 1 illustrates a data flow diagram for predicting infrastructure failures in a data center for hosted service mitigation actions, according to some embodiments. As noted above, data center 100 may include servers and other infrastructure systems and components that host services or other computing operations. Hosted service(s) 130, for example, may provide various storage, processing, communication, analysis, simulation functions. Hosted service(s) 130 may be implemented utilizing various hardware components of data center 100, including various computing systems such as computing system 1000 in FIG. 10 or other servers, nodes, or computing devices, in addition to networking devices, such as switches, routers, bricks, or other networking equipment to facilitate communication between the various hardware components of data center 100 as part of computing and networking infrastructure.

In addition to the computing and networking infrastructure noted above, data center 100 may also rely upon other infrastructure systems 110, including power systems (which may provide diverse power supplies, such as interruptible power supplies, uninterruptible power supplies, and reserve or backup power supplies and the various physical components, including lines, switches, power modules, and power distribution units (PDUs)) to provide electrical power support and environmental systems (which may provide various temperature controls, air handling controls, and humidity controls) to provide cooling and support other favorable environmental conditions.

Infrastructure systems 110 may collect various operational metrics. Power management, for instance, may collect information on the capacity of reserve or backup system fuel supplies, stored energy in uninterruptible power supplies, and the quality of energy supplied by external providers, such as utilities. Computing infrastructure may report utilization and life cycle operational metrics and networking infrastructure may report network traffic conditions. Operational metrics 112 such as these (and many other types of operational metrics) may be provided to infrastructure monitoring and failure analysis system 120.

Infrastructure monitoring and failure analysis system 120 may aggregate, parse, process, and store the operational metrics. Infrastructure monitoring and failure analysis system 120 may generate failure models from the collection data, such as discussed below with regard to FIG. 7. For example, time series data representing up time and down time for different components, functionalities, or portions of the operation of infrastructure systems or resources may be analyzed to determine mean failure times for the different components, functionalities, or portions of the operation of infrastructure systems or resources. In some embodiments, data mining, machine learning, and other predictive techniques may be utilized to evaluate the operational metrics 112 collected from infrastructure systems 110. Infrastructure monitoring and failure analysis system 120 may then predict infrastructure failure events (e.g., hardware, networking, environmental or power failures) and provide the failure event predictions 122 to hosted service(s) 130. Over time failure models may become more accurate due to feedback and other reinforcement learning techniques based on the accuracy of failure event predictions. For example, hosted service(s) 130 may report mitigation actions 132 taken (and/or not taken) in response to received failure event predictions. Moreover, correlated failures between different infrastructure systems may be identified so that a failure event prediction may include multiple related infrastructure failures likely to occur.

Infrastructure failure event predictions 122 may include different data, such as affected devices, estimated time to failure, and/or probability of occurrence. In at least some embodiments, recommendations for mitigation actions may be included in failure event predictions (e.g., redirect network traffic away from rack A). Hosted service(s) 130 may implement various techniques, such as those discussed below with regard to FIGS. 8 and 9, to select mitigation actions or other responsive actions including delaying responses or ignoring predictions. In some embodiments, notifications of failure event predictions may be provided to a client of hosted service(s) 130, such as illustrated and discussed below with regard to FIG. 6, or provided directly from infrastructure monitoring and failure analysis system 120.

Please note that previous descriptions are not intended to be limiting, but are merely provided as a logical example of providing failure event predictions. Various components may perform infrastructure monitoring and analysis. Different numbers or types of services or sources of data may be analyzed to predict infrastructure failure events. Moreover, collection of operational metrics, monitoring of operational metrics, and prediction of failure events may be implemented for services hosted across multiple data centers.

This specification begins with a general description of a provider network, which may implement data centers that perform predicting infrastructure failures for mitigation actions performed by services hosted in the provider network. Then various examples of a monitoring service are discussed, including different components/modules, or arrangements of components/module that may be implemented and which may perform predicting infrastructure failures and providing the predictions to services. A number of different methods and techniques to implement predicting infrastructure failures in a data center for hosted service mitigation actions are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
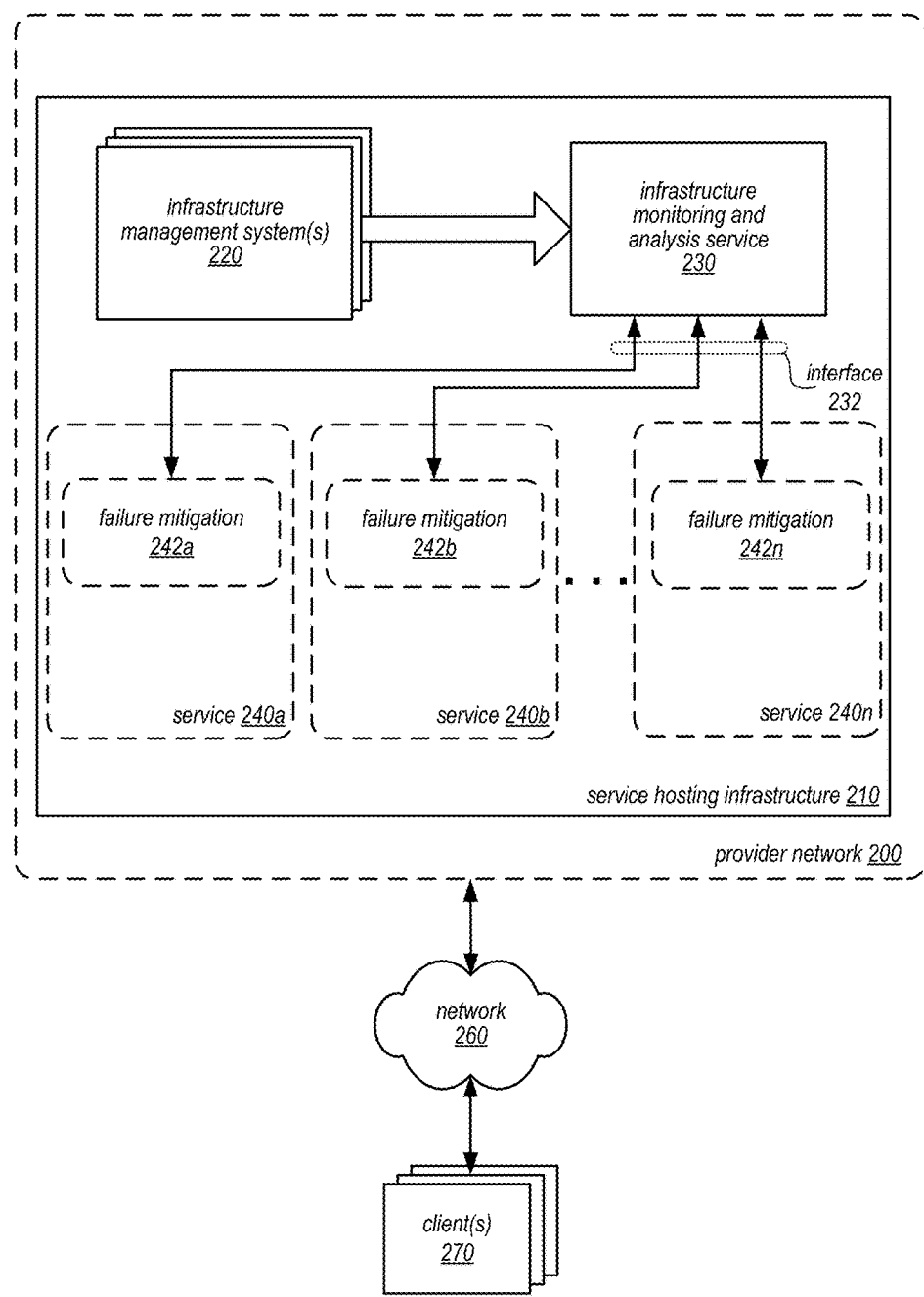
FIG. 2 is a block diagram illustrating a provider network that includes multiple network-based services and a monitoring service that implements predicting infrastructure failures in a data center for hosted service mitigation actions, according to some embodiments.

FIG. 2 is a block diagram illustrating a provider network that includes multiple network-based services and a monitoring service that implements predicting infrastructure failures in a data center for hosted service mitigation actions, according to some embodiments. Provider network 200 may be set up by an entity such as a company or a public sector organization to provide one or more services 240 (such as various types of cloud-based computing or storage) accessible via the Internet and/or other networks to clients 270. Provider network 200 may include numerous data centers, such as data center 100 implementing collectively service hosting infrastructure 210, which may, for example, provide various resource pools, such as collections of physical and/or virtualized computer servers, storage devices, networking equipment and the like (e.g., computing system 1000 described below with regard to FIG. 10), at one or multiple computing facilities in the same or different geographic locations needed to implement and distribute the services 240 offered by the provider network 200. Infrastructure management system(s) 220 may be implemented to control the various infrastructure resources for different data centers, including the aforementioned computing and networking hardware, as well as other infrastructure resources, including power and environmental infrastructure resources. Clients 270 may access these various services offered by provider network 200 via network 260 (which may be connected to networking systems that are implemented as part of service hosting infrastructure 210. Likewise network-based services 240 may themselves communicate and/or make use of one another to provide different services via networking infrastructure systems implemented as part of service hosting infrastructure 210.

Provider network 200 may implement many different kinds of network-based services, such as services 240*a*, 240*b*, through 240*n*, and thus the following discussion of various services is not intended to be limiting. For example, various network-based services 240 may be implemented, such as deployment service(s), management service(s), application service(s), and analytic service(s). In some embodiments, provider network 200 may implement storage service(s) that provide different types of storage. For example, storage service(s) may be an object or key-value data store that provides highly durable storage for large amounts of data organized as data objects. In some embodiments, storage service(s) may include an archive long-term storage solution that is highly-durable, yet not easily accessible, in order to provide low-cost storage. In some embodiments, storage service(s) may provide virtual block storage for other computing devices, such as compute instances implemented as part of a virtual computing service. A block-based storage service is a storage system, composed of a pool of multiple independent resource hosts, which provide block level storage for storing one or more sets of data volumes. Data volumes may be mapped or attached to particular client(s) (e.g., a virtual compute instance of virtual compute service), providing virtual block-based storage (e.g., hard disk storage or other persistent storage) as a contiguous set of logical blocks.

In some embodiments, provider network 200 may implement database service(s). Database services may include many different types of databases and/or database schemes. Relational and non-relational databases may be implemented to store data, as well as row-oriented or column-oriented databases. For example, a database service that stores data according to a data model in which each table maintained on behalf of a client contains one or more items, and each item includes a collection of attributes, such as a key value data store. In such a database, the attributes of an item may be a collection of name-value pairs, in any order, and each attribute in an item may have a name, a type, and a value. Some attributes may be single valued, such that the attribute name is mapped to a single value, while others may be multi-value, such that the attribute name is mapped to two or more values.

Provider network 200 may implement networking service(s) in some embodiments. Networking service(s) may configure or provide virtual networks, such as virtual private networks (VPNs), among resources implemented in provider network 200 as well as control access with external systems or devices. For example, networking service(s) may be configured to implement security groups for compute instances in a virtual network. Security groups may enforce one or more network traffic policies for network traffic at members of the security group. Membership in a security group may not be related to physical location or implementation of a compute instance. The number of members or associations with a particular security group may vary and may be configured.

Networking service(s) may manage or configure the internal network for provider network 200 (and thus may be configured for implementing various resources for a client 270). For example, an internal network may utilize IP tunneling technology to provide a mapping and encapsulating system for creating an overlay network on network and may provide a separate namespace for the overlay layer and the internal network layer. Thus, in this example, the IP tunneling technology provides a virtual network topology; the interfaces that are presented to clients 270 may be attached to the overlay network so that when a client 270 provides an IP address that they want to send packets to, the IP address is run in virtual space by communicating with a mapping service (or other component or service not illustrated) that knows where the IP overlay addresses are.

In some embodiments, provider network 200 may implement a virtual computing service, to provide computing resources. These computing resources may in some embodiments be offered to clients in units called "instances," such as virtual or physical compute instances or storage instances. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor) or machine image. A number of different types of computing devices may be used singly or in combination to implement compute instances, in different embodiments, including general purpose or special purpose computer servers, storage devices, network devices and the like. In some embodiments clients 270 or other any other user may be configured (and/or authorized) to direct network traffic to a compute instance.

Compute instances may operate or implement a variety of different platforms, such as application server instances, Java™ virtual machines (JVMs), general purpose or special-purpose operating systems, platforms that support various interpreted or compiled programming languages such as Ruby, Perl, Python, C, C++ and the like, or high-performance computing platforms) suitable for performing client 250 applications, without for example requiring the client 250 to access an instance. In some embodiments, compute instances have different types or configurations based on expected uptime ratios. The uptime ratio of a particular compute instance may be defined as the ratio of the amount of time the instance is activated, to the total amount of time for which the instance is reserved. Uptime ratios may also be referred to as utilizations in some implementations. If a client expects to use a compute instance for a relatively small fraction of the time for which the instance is reserved (e.g., 30%-35% of a year-long reservation), the client may decide to reserve the instance as a Low Uptime Ratio instance, and pay a discounted hourly usage fee in accordance with the associated pricing policy. If the client expects to have a steady-state workload that requires an instance to be up most of the time, the client may reserve a High Uptime Ratio instance and potentially pay an even lower hourly usage fee, although in some embodiments the hourly fee may be charged for the entire duration of the reservation, regardless of the actual number of hours of use, in accordance with pricing policy. An option for Medium Uptime Ratio instances, with a corresponding pricing policy, may be supported in some embodiments as well, where the upfront costs and the per-hour costs fall between the corresponding High Uptime Ratio and Low Uptime Ratio costs.

Compute instance configurations may also include compute instances with a general or specific purpose, such as computational workloads for compute intensive applications (e.g., high-traffic web applications, ad serving, batch processing, video encoding, distributed analytics, high-energy physics, genome analysis, and computational fluid dynamics), graphics intensive workloads (e.g., game streaming, 3D application streaming, server-side graphics workloads, rendering, financial modeling, and engineering design), memory intensive workloads (e.g., high performance databases, distributed memory caches, in-memory analytics, genome assembly and analysis), and storage optimized workloads (e.g., data warehousing and cluster file systems). Size of compute instances, such as a particular number of virtual CPU cores, memory, cache, storage, as well as any other performance characteristic. Configurations of compute instances may also include their location, in a particular data center, availability zone, geographic, location, etc. . . . and (in the case of reserved compute instances) reservation term length.

In various embodiments, provider network 200 may implement components to coordinate the metering and accounting of client usage of network-based services 240 by tracking the identities of requesting clients, the number and/or frequency of client requests, the size of data stored or retrieved on behalf of clients, overall storage bandwidth used by clients, class of storage requested by clients, or any other measurable client usage parameter. Provider network 200 may also implement financial accounting and billing service(s), or may maintain a database of usage data that may be queried and processed by external systems for reporting and billing of client usage activity. In certain embodiments, provider network 200 may implement components of a metering service that may be configured to collect, monitor and/or aggregate a variety of service operational metrics, such as metrics reflecting the rates and types of requests received from clients, bandwidth utilized by such requests, system processing latency for such requests, system component utilization (e.g., network bandwidth and/or storage utilization within the storage service system), rates and types of errors resulting from requests, characteristics of stored and requested data pages or records thereof (e.g., size, data type, etc.), or any other suitable metrics. In some embodiments such metrics may be used by system administrators to tune and maintain system components (e.g., as part of monitoring service 220), while in other embodiments such metrics (or relevant portions of such metrics) may be exposed to clients to enable such clients to monitor their usage of network-based services 240.

In some embodiments, provider network 200 may implement components to implement user authentication and access control procedures, such as access management service(s), for provider network 200 resources. For example, for a given network-based services 240 request to access a particular compute instance, provider network 200 may implement components configured to ascertain whether the client associated with the access is authorized to configured or perform the requested task. Authorization may be determined such by, for example, evaluating an identity, password or other credential against credentials associated with the resources, or evaluating the requested access to the provider network 200 resource against an access control list for the particular resource. For example, if a client does not have sufficient credentials to access the resource, the request may be rejected, for example by returning a response to the requesting client indicating an error condition.

Network-based services 240 implemented as part of provider network 200 may each implement respective programmatic interfaces, in some embodiments. For example, requests directed to virtual computing service may be formatted according to an API for the virtual computing service, while requests to storage service(s) may be formatted according to an API for storage service(s). Different portions of the various APIs may be exposed to external clients, in some embodiments, with some other portions remaining available to internal clients, such as other network-based services 240 in provider network 200.

Network-based services 240 may respectively implement different failure mitigation components 242, such as failure mitigation components 242a, 242b, through 242n. Failure mitigation components 242 may perform various responsive actions and mitigation actions for failure detected during the operation and performance of an individual service 240. For example, failure mitigation component 242a may detect that storage node hosting a replica of data is down or unavailable in service 240a, and may trigger a replication operation by another storage node to create a new replica of the data. Failure mitigation components 242 may also interact with infrastructure monitoring and analysis service 230 (discussed in more detail below) which may provide a programmatic interface 232 via which predictions of infrastructure failure events may be received. Failure mitigation components may then perform mitigation actions according to various techniques, like those discussed below with regard to FIGS. 8 and 9, and report back performed mitigation actions to infrastructure monitoring and analysis service 230.

Clients 270 may encompass any type of client configurable to submit requests to network provider 200. For example, a given client 270 may include a suitable version of a web browser, or may include a plug-in module or other type of code module configured to execute as an extension to or within an execution environment provided by a web browser. Alternatively, a client 270 may encompass an application such as a database application (or user interface thereof), a media application, an office application or any other application that may make use of compute instances, a data volume, or other network-based service in provider network 200 to perform various operations. In some embodiments, such an application may include sufficient protocol support (e.g., for a suitable version of Hypertext Transfer Protocol (HTTP)) for generating and processing network-based services requests without necessarily implementing full browser support for all types of network-based data. In some embodiments, clients 270 may be configured to generate network-based services requests according to a Representational State Transfer (REST)-style network-based services architecture, a document- or message-based network-based services architecture, or another suitable network-based services architecture. In some embodiments, a client 270 (e.g., a computational client) may be configured to provide access to a compute instance, data volume, or other resource hosted by a service in a manner that is transparent to applications implemented on the client 270 utilizing the resources provided by the services.

Clients 270 may convey network-based services requests to provider network 200 via external network 260. In various embodiments, external network 260 may encompass any suitable combination of networking hardware and protocols necessary to establish network-based communications between clients 270 and provider network 200. For example, a network 260 may generally encompass the various telecommunications networks and service providers that collectively implement the Internet. A network 260 may also include private networks such as local area networks (LANs) or wide area networks (WANs) as well as public or private wireless networks. For example, both a given client 270 and provider network 200 may be respectively provisioned within enterprises having their own internal networks. In such an embodiment, a network 260 may include the hardware (e.g., modems, routers, switches, load balancers, proxy servers, etc.) and software (e.g., protocol stacks, accounting software, firewall/security software, etc.) necessary to establish a networking link between given client 270 and the Internet as well as between the Internet and provider network 200. It is noted that in some embodiments, clients 270 may communicate with provider network 200 using a private network rather than the public Internet.

Figure 3:
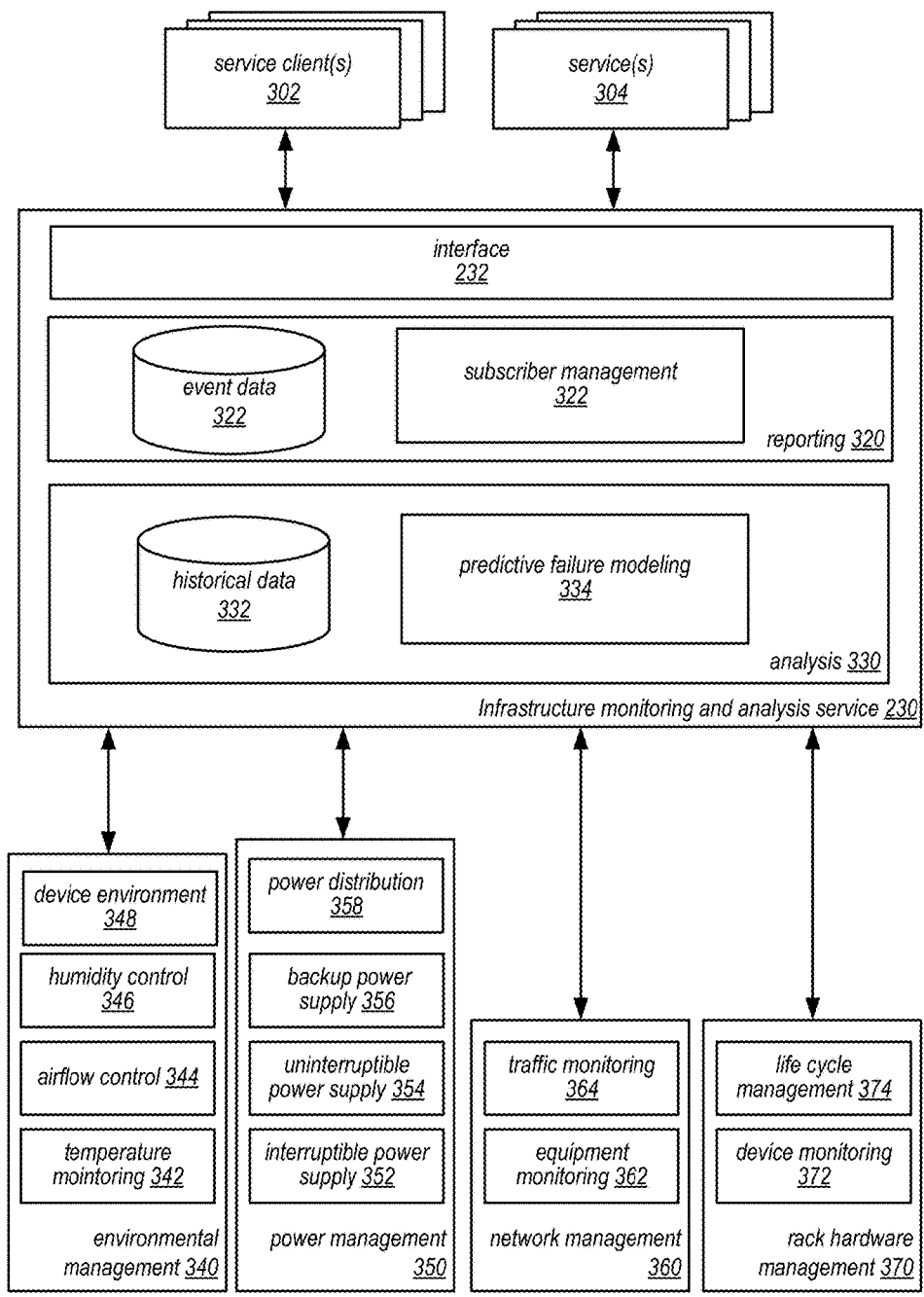
FIG. 3 is a logical block diagram illustrating a monitoring service that implements predicting infrastructure failures in a data center for hosted service mitigation actions, according to some embodiments.

Provider network 200 may implement infrastructure monitoring and analysis service 230 in order to monitor the collected operational metrics from infrastructure management systems and predict infrastructure failure events, in various embodiments. Infrastructure monitoring and analysis service 230 may be implemented across multiple data centers of service hosting infrastructure 210 (e.g., replicated in multiple data centers). FIG. 3 is a logical block diagram illustrating a monitoring service that implements predicting infrastructure failures in a data center for hosted service mitigation actions, according to some embodiments. Infrastructure monitoring and analysis service 230 may implement interface 232 to interact with various service client(s) 302 directly (e.g., like clients 270 in FIG. 2), service(s) 304 (e.g., services 242 in FIG. 2), or any other systems, applications, or devices that may utilize infrastructure failure event predictions.

In various embodiments, monitoring service 230 may implement analysis 330 to process operational metrics collected from different infrastructure management systems. Analysis 330 may pre-process, parse, annotate, or otherwise configure collected metrics and store them in historical data store 332 for subsequent modeling and evaluation. Different infrastructure management systems may provide operational metrics.

In at least some embodiments, an environmental management system 340 may provide operational metrics. Environmental management may perform temperature monitoring 342 in some embodiments. Temperature monitoring may collect various ambient or system temperatures at different locations within a data center. For example, different rooms or aisles within a data center may have respective temperature sensors in order to collect periodic temperature data for the room or aisle. These metrics may be provided to monitoring service 230. Environmental management may also implement airflow control 344. Airflow control 344 may provide various cooling and other heat reduction techniques and systems in a data center. For instance, airflows may be increased, decreased, or re-directed based on temperature data for a location in a data center. The airflow control decisions, such as amount of airflow, direction of airflow, or other operational decisions may be reported as operational metrics to monitoring service 230. Environmental management 340 may also implement humidity control 346. Humidity control 346 may implement various sensors, akin to the temperature sensors discussed above, to monitor the moisture in the air in various data center locations. In some instances, control techniques to introduce dry air or remove humidity may be performed at the direction humidity control 346. Control actions and humidity observations may be reported to monitoring service 230. Devices may also report environmental metrics 348, such as engine temperatures (for backup generators), internal rack humidity, or various other system components or devices that may be implemented in the data center.

In at least some embodiments, a power management system 350 may provide operational metrics to monitoring system 230. For example, power management may control and analyze the power supplied by utilities and other interruptible power suppliers 352 to identify power interruptions or other power failure scenarios based on power quality. Power management 350 may monitor and control draws upon uninterruptible power supply (UPS) 354. For instance, UPS 354 may be implemented as battery or other stores of electrical power which may be utilized in failure scenarios to provide time for backup power supplies to come online. Power management 350 may provide operational metrics, such as the amount or state of stored power in UPS 354 or indicate when switches between UPS 354 and interruptible power supply 352 (or backup power supply 356) occur. Backup power supply 356 may power generators that provide an alternative power supply to a data center. Fuel supplies to power the power generators may be reported along with different failures or other operational statics concerning backup power supply 356 (e.g., which generators are online, available, or offline for repair). The state of power distribution components 358 may be monitored and reported to monitoring service 230. For instance, failures of switches, power distribution units (PDUs) or other distribution components may be reported, as well as time in operation metrics for the distribution components.

In some embodiments, network management system 360 may provide operational metrics to monitoring service 230. For example, equipment monitoring 362 may be performed to provide failures, state, or other information about network switches, backbones, cabling, routers, bricks, or other networking infrastructure. Traffic monitoring 364 may be performed to identify traffic loads across network services at different networking equipment, which may be reported to monitoring service 230. For instance, individual services may have insight into the traffic processed at a service component (e.g., at a server, node, or other application operating as part of a service). However, the totality of all network traffic at network equipment (e.g., as networking equipment and other infrastructure resources may host portions of different services at the same resource, such as on the same server rack) may not be visible, and thus traffic monitoring 364 may provide operational metrics useful to understand potential failure events indicated by traffic events.

In some embodiments, rack hardware management 370 may be implemented to provide operational metrics for computing hardware implemented on racks in a data center to monitoring service 230. For example, device monitoring 372 may be implemented to provide utilization statistics for storage devices (e.g., hard drives), processors, individual servers, or other hardware hosting services. Additional failure statistics may be reported for devices. Life cycle management 374 may report replacement or upgrade schedules for hardware devices, or racks of hardware devices, and other information relevant to remaining life for hardware devices.

Analysis 330 may implement predictive failure modeling 334 to generate and update failure models for different infrastructure failure events based on received operational metrics and/or historical data 332. Various machine learning, pattern recognition, predictive analysis, or other techniques may be performed, such as those discussed below with regard to FIG. 7. For example, operational metrics collected by power management 350 describing power source quality and other related data may be provided to infrastructure monitoring and analysis service 230 in order to detect possible infrastructure failure events that may be caused by possible potential interruptions (e.g., utility brown outs or surges). For instance predictive failure modeling 334 may evaluate a waveform of a high-voltage power feed supplied to an electrical load for service infrastructure 230 (e.g., to a particular data center) to determine if one or more waveform patterns are present in the waveform. A waveform pattern indicates, by its presence in a waveform of a power feed, a power event associated with the power feed, and some waveform patterns indicate potential interruption of the power feed. Predictive failure modeling 334 may determine a prediction of a power interruption based on current power data, as well as machine learning analysis on power data previously collected and analyzed in order to recognize possible power interruptions. Predictions may be made to provide an estimated time between recognition of the problematic wave form and the predicted power interruption based on past times between wave form recognition and power interruption occurrence. The effect of the power interruption, whether to a room or to an entire data center may be determined, as well as the length of time without power.

In another example, predictive failure modeling 334 may analyze temperature monitoring and airflow control data received as operational metrics collected from environmental management 340. Such metrics may indicate a hot spot in a particular location in a data center. Predictive failure modeling 334 may access past historical data 332 to recognize whether the current host spot may be remedied by applied cooling techniques. If not, a predicted time till server shut down in the hot spot may be estimated based upon past temperature and shutdown occurrences. Similarly, network traffic data collected as operational metrics from network management 360 may be evaluated by predictive failure modeling to indicate oncoming traffic storms or network partitions that may occur as infrastructure failures based upon historical data 332. In some embodiments, failures that correlate with other infrastructure failures, such as power failures, may be predicted by predictive failure modeling 334. For instance, a predicted network failure event, such as a network partition, may be identified in conjunction with identifying a potential power interruption for a data center or part of a data center. Predictive failure modeling 334 may also evaluate historic data on hardware failures or replacement schedules collected from rack hardware management 370 as part of operational metrics may also be utilized to predict storage device failures, network card failures, or switch failures on a server rack. Infrastructure failure event predictions may identify server racks for possible failures events due to upgrades, patch installations, or detected bugs or malicious software installed on hardware devices.

Monitoring service 230 may also implement reporting 320 to provide notifications of predicted infrastructure failure events. For instance, subscriber management 322 may be implemented to register services for different types of infrastructure failure events. Some services may be more tolerant of certain failures and may thus not want to receive failure predictions for those types of failures, for instance. Subscriber management 322 may also allow service(s) 304 (or service client(s) 302) to define thresholds for sending one or multiple notifications for the same predicted failure event (e.g., based on changes in probability of occurrence or estimated time to failure). In this way, the number of predicted failure events can be controlled to suit a service's preferences or capabilities. Event data 322 may be maintained to track events and associated details reported to service(s) 304. In this way, operators of service(s) 304 may review predictions and the data upon which they are made for further analysis, such as discussed below with regard to FIG. 5.

Interface 232 may provide a programmatic interface, such as application programming interface (API) via which notifications of predicted infrastructure failure events may be provided. For instance, formatting of the event type, estimated time of occurrence, probability of occurrence, affected resources, or other pertinent information may be dictated by the interface 232 so that services may easily parse and evaluate the notification. Interface 232 may also be implemented as part of a graphical user interface to provide further information to operators of services to review predicted infrastructure failure events, as discussed below with regard to FIG. 5. Feedback from service(s) 304 or service client(s) 302 may be provided which identifies mitigation actions taken (and/or not taken) in response to reported failure events. This feedback may be stored in historical data 332 along with other operational metrics for use in improving prediction of infrastructure failure events.

Please note that the previous examples discussed above with regard to operational metrics and infrastructure systems are not intended be limiting. Nor are the various techniques for predicting infrastructure failure events or notifying predictions of failure events to service client(s) or service(s).

Figure 4:
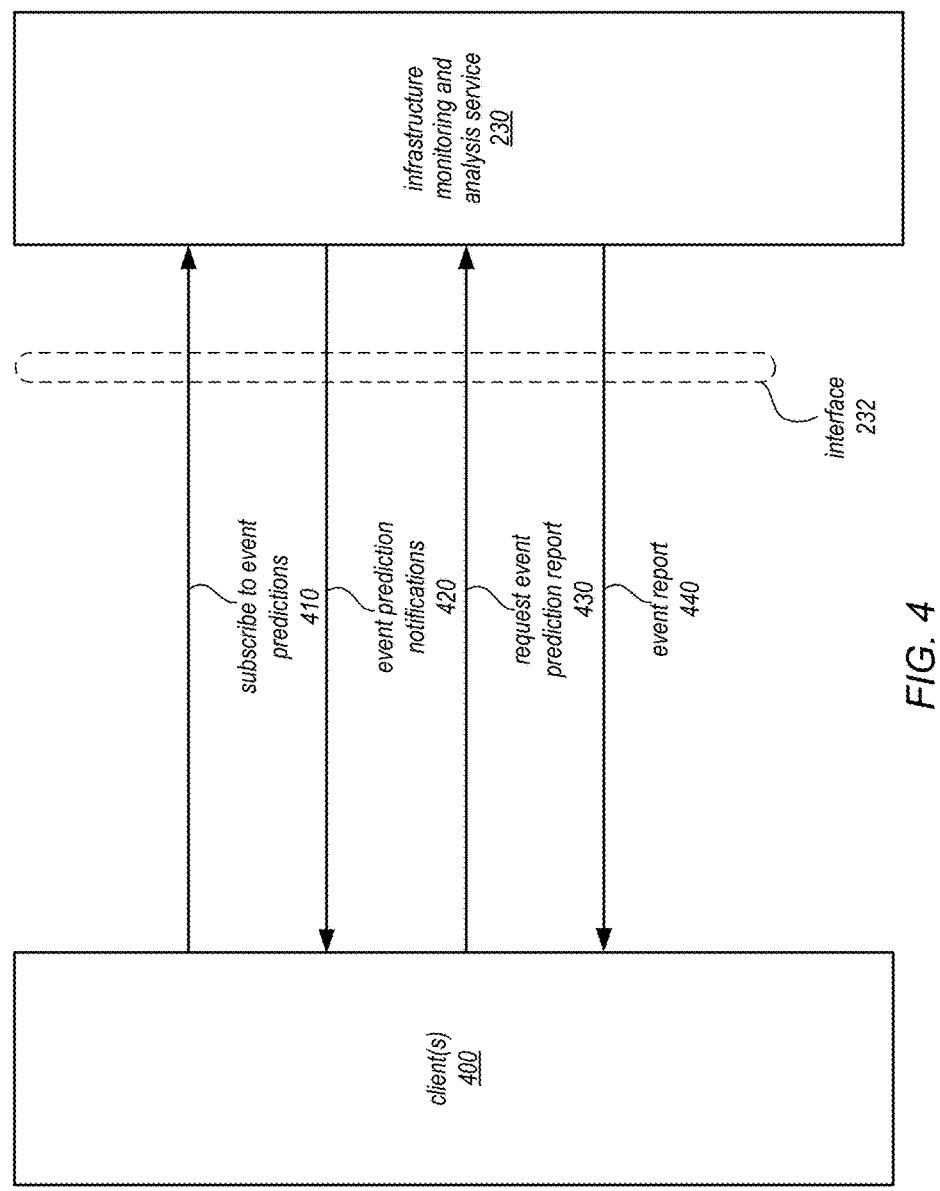
FIG. 4 is a logical block diagram illustrating interactions between clients and an infrastructure monitoring service, according to some embodiments.

FIG. 4 is a logical block diagram illustrating interactions between clients and an infrastructure monitoring and analysis service, according to some embodiments. Client(s) 400 may be service(s) hosted at a data center or computing devices controlled by operators of service(s) to interact with infrastructure monitoring and analysis service 230 via interface 232. For example, in various embodiments, client(s) 400 may send a request to subscribe to event predictions 420. The request may identify types of infrastructure failure events, specific events, and information to be included about the events. In some embodiments, probability thresholds or estimated to failure thresholds may be defined for events so that a prediction is not sent for a type of infrastructure failure event unless the probability of occurrence is above a particular confidence threshold (e.g., >40%). Infrastructure monitoring and analysis service 230 may send event prediction notifications 420 via interface 232. The notifications may include the various information subscribed to in request 410. In some embodiments, infrastructure monitoring and analysis service 230 may provide unsubscribed infrastructure failure events (e.g., high risk or high impact event predictions may always be provided) to client(s) 400.

Figure 5:
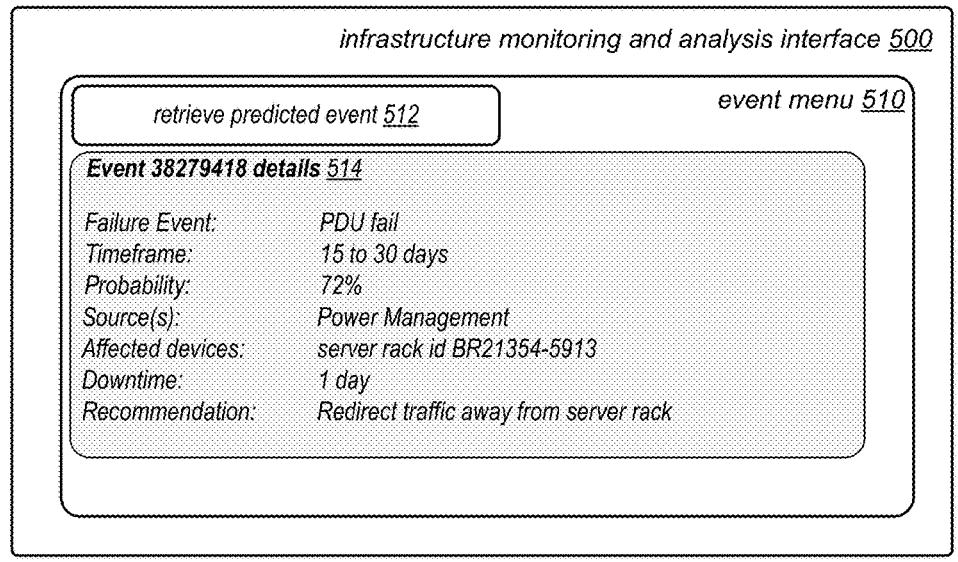
FIG. 5 is an example graphical user interface for a monitoring service to provide a view of a predicted infrastructure failure event, according to some embodiments.

In at least some embodiments, a request may be sent 430 for an event prediction report, which may be returned 440 with details describing the predicted infrastructure failure event. FIG. 5 is an example graphical user interface for a monitoring service to provide a view of a predicted infrastructure failure event, according to some embodiments. Infrastructure monitoring and analysis interface 500 may be implemented to provide a textual or graphical presentation of predicted infrastructure failure events, in some embodiments. Event menu element 510 may provide an event lookup or retrieval mechanism 512. For instance, a notification or other indication provided to a service may include an event identifier or other indication of how to retrieve data for the predicted event. The event identifier may be input into retrieve predicted event element 512 to display event details.

For instance, details for predicted infrastructure failure event 38279418 may be retrieved and displayed in element 514. Event details 514 may include the type of failure event (e.g., a PDU fail), an estimated time to fail (e.g., Timeframe 14 to 30 days), a probability of event occurrence (e.g., 72%), a source infrastructure system (e.g., Power Management), affected devices (e.g., server rack id BR21354-5913), and length of event (e.g., Downtime 1 day). In some embodiments, recommended mitigation actions may be provided, such as the recommendation to "redirect traffic away from sever rack." Correlated failure events may also be identified in details 514 (not illustrated).

Figure 6:
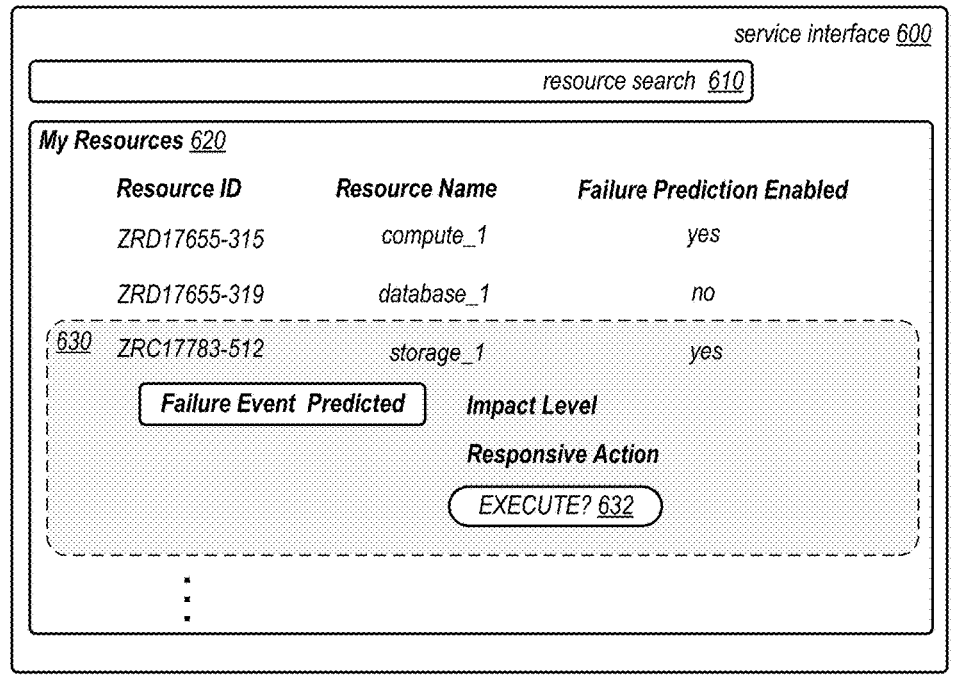
FIG. 6 is an example graphical user interface for a service to provide a notification of a predicted failure event that may impact a client resource implemented by the service, according to some embodiments.

Services may also choose to provide some customers with predictions of failure events in some embodiments. FIG. 6 is an example graphical user interface for a service to provide a notification of a predicted failure event that may impact a client resource implemented by the service, according to some embodiments. Service interface 600 may be implemented to provide a textual or graphical presentation of customer or client resources affected by predicted infrastructure failure events, in some embodiments. Resource search element 610 may provide a service resource lookup or retrieval mechanism. For instance, a resource identifier, resource type, or other information may be input to retrieve resource information matching the input information.

Resources listing 620 may provide a listing of searched for, or all, resources of a client or customer account for a particular service (or across a provider network). Identifying information about the resources including, ID, resource name, management options, such as whether or not failure prediction is enabled for a resource may be displayed. In at least some embodiments, a customer or client of a service may opt in to receive notifications of predicted failure events (e.g., directly as discussed above with regard to FIGS. 3 and 4). Additionally, mitigation actions or communication options may be selected or enabled. For example, as illustrated in FIG. 6, a display element highlighting resource ZRC17783-512 identifies the resource as affected by a predicted failure event. In some embodiments, the failure event may be identified or generalized to denote a failure that is not specified. The indication of the failure event prediction may be color coded, in some embodiments, to indicate probability of occurrence. Other details may be included, such as the impact level upon the resource (e.g., unavailable, slow down, limited functionality, etc.) may be provided. In some embodiments, a responsive action may be identified (e.g., according to the techniques discussed below with regard to FIGS. 8 and 9). In at least some embodiments, an interface element, such as a selection button 632 may be provided to execute the recommended responsive action. Alternatively, in some embodiments a client may be able to predetermine different mitigation responses based on the predicted failure in ways similar to the mitigation action selections made by services (as discussed below with regard to FIGS. 8 and 9).

Please note that FIGS. 5 and 6 are provided merely as an example of a graphical user interfaces, and thus neither FIGS. 5 and 6 nor the accompanying discussion are intended to be limiting as to other interfaces that may be implemented to provide information predicted infrastructure failure events. Different user interface elements, arrangements of information, and other display or interface techniques may be implemented.

Figure 7:
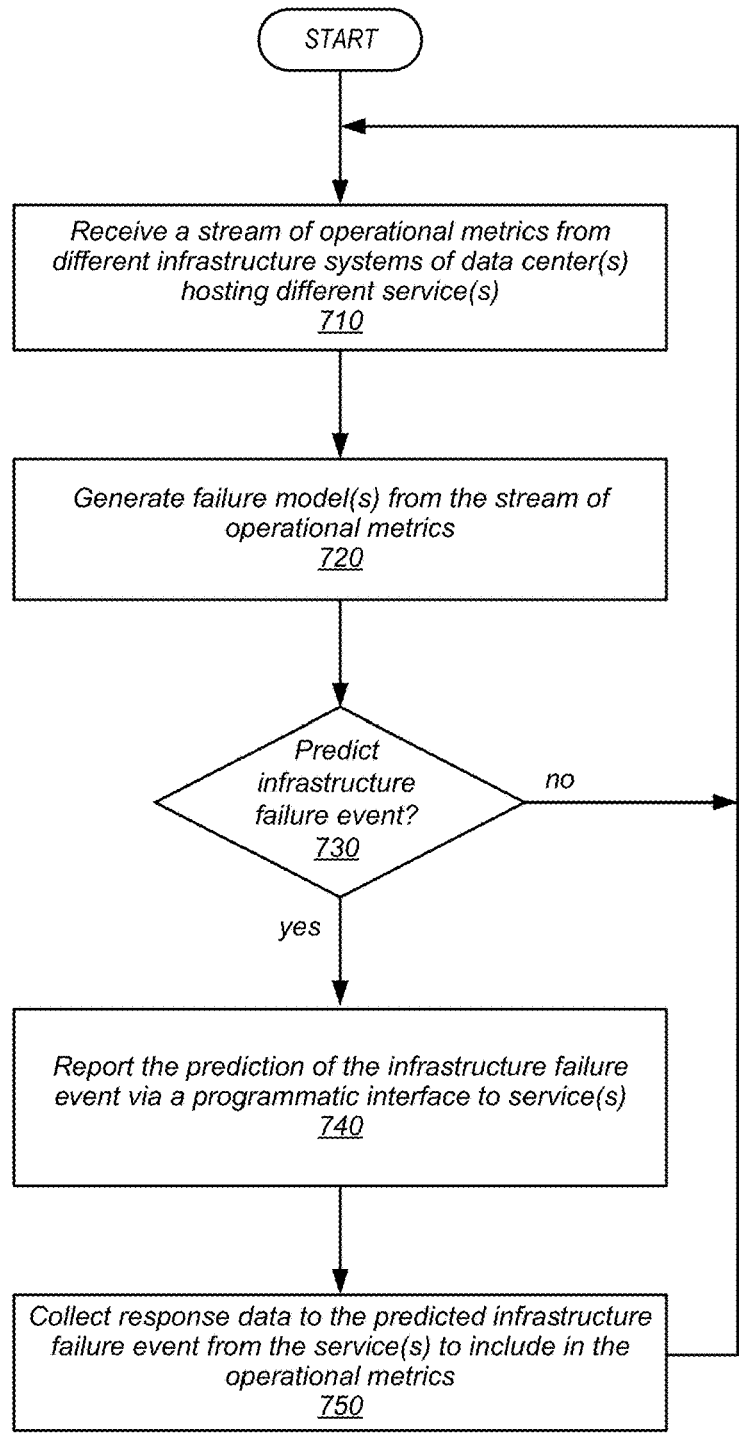
FIG. 7 is a high-level flowchart illustrating various methods and techniques predicting infrastructure failures in a data center for hosted service mitigation actions, according to some embodiments.

The examples of predicting infrastructure failures in a data center for hosted service mitigation actions in FIGS. 2-6 have been given in regard to a provider network implementing multiple data centers and services. However, various other types of data centers may host services may implement the same or different infrastructure resources which may impact the performance of the services and therefore may implement predicting infrastructure failures in a data center for hosted service mitigation actions. FIG. 7 is a high-level flowchart illustrating various methods and techniques predicting infrastructure failures in a data center for hosted service mitigation actions, according to some embodiments. These techniques may be implemented using a monitoring service and hosted service as described above with regard to FIGS. 2-6, as well as other systems, servers, and computing devices, and thus the following discussion is not intended to be limiting as to the other types or configurations of data centers or services that may implement the described techniques.

As indicated at 710, a stream of operational metrics from different infrastructure systems of a data center hosting different service(s) may be received, in various embodiments. For example, data center(s) may include multiple different infrastructure management systems which may provide multiple types of operational metrics, including metrics for environmental management (e.g., temperature data, airflow control data, or humidity control data), power management (e.g., interruptible power supply data, uninterruptible power supply data, backup power supply data, or power distribution component data), networking management (e.g., networking equipment monitoring data or traffic monitoring data), and hardware management (e.g., device monitoring data or life cycle management data).

As indicated at 720, failure models may be generated from the stream of operational metrics. Failure models can be generated in different ways. For example, historical failure events may be plotted in time series to evaluate some infrastructure failures with other infrastructure failures (e.g., power failures correlated with storage device failures). Machine learning data techniques may be applied to recognize common features of different failure events. For instance, historic traffic patterns may be evaluated to identify common traffic pattern features (e.g., increases on certain network devices) that indicate that a network partition or traffic storm may affect certain portions of networking equipment. Other failure models may be implemented by rule or knowledge-based systems. For instance, rules that indicate that servers shut-down when ambient or device temperature is above a certain value may be applied to temperature data. Failure models may also be utilized to determine an estimated time till a predicted failure. Mean-time between failure modeling for devices may indicate potential failure event times, for instance.

Probability of occurrence may also be determined for infrastructure failure events utilizing different confidence measures. Confidence measures may be dependent on the model. For example, if predictive analysis is based on data fit techniques, then a confidence value for the prediction may be determined based on the plot of the criteria for a predicted event versus the plot of criteria for a historical event (or other standard used for classifying whether or not an infrastructure failure event will occur). Note, that many different types of predictive failure modeling techniques and, therefore, the previous examples are not intended to be limiting.

As indicated by the negative exit of 730, if no failure events are detected, then monitoring and analysis of operational metrics and models may continue. If a failure event is detected, as indicated by the positive exit from 730, then a prediction of the infrastructure failure event may be reported via a programmatic interface to one or more services. The programmatic interface may be an interface for a monitoring service, such as described above in FIGS. 2-4, in order to allow for services to subscribe for and receive notifications of predicted failure events. In at least some embodiments, the type of predicted infrastructure failure event may be determined to identify those services that have subscribed to receive the event. Determinations of recommended mitigation actions may also be provided along with the reported prediction of the failure event, in some embodiments. For example, one data center (out of a group of data centers) may have a predicted power failure event. A recommendation may be included to migrate essential operations out of the identified data center to another data center.

As indicated at 750, in some embodiments response data to the predicted infrastructure failure event may be collected for inclusion in the operational metrics from the services. For example, the different mitigation actions performed (or not performed), such as various data migrations, replications, placement changes, reconfigurations, or any other type of mitigation action may be described and collected. The response data may then be used to update failure models (and/or techniques to determine mitigation recommendations) for future infrastructure failure event predictions. Monitoring and analysis of operational metrics and failure models may continue for data center(s) indefinitely as indicated by the arrow from element 750 back to element 710.

Figure 8:
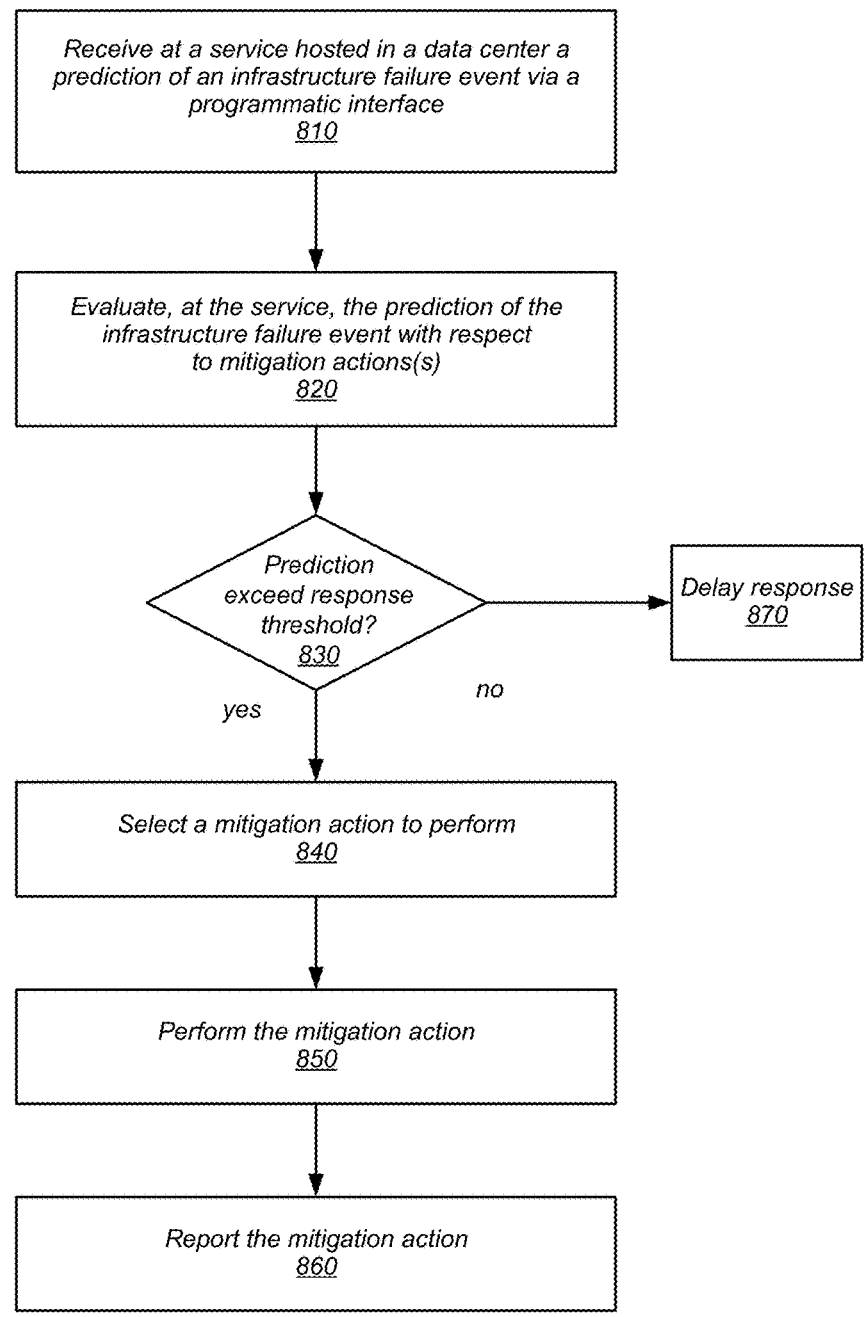
FIG. 8 is a high-level flowchart illustrating various methods and techniques evaluating predicted infrastructure failure events at a hosted service, according to some embodiments.

As noted above, mitigation actions may be performed by services in order to mitigate potential infrastructure failure events. FIG. 8 is a high-level flowchart illustrating various methods and techniques evaluating predicted infrastructure failure events at a hosted service, according to some embodiments. As indicated at 810, a prediction of an infrastructure failure event may be received at a service hosted at a data center. The failure event may be formatted according to the programmatic interface (e.g., interface 232 in FIG. 2). The prediction may be parsed to retrieve various information about the failure event including, type of failure event (e.g., an overheat failure of a server rack), an estimated time to fail (e.g., 30 minutes), a probability of event occurrence (e.g., 90%), a source infrastructure system (e.g., Environmental Management), affected devices (e.g., server rack id), and length of event (e.g., 1 hour downtime).

As indicated at 820, the prediction of the infrastructure failure event may be evaluated with respect to possible mitigation action(s). Mitigation actions may be any action performed by service to mediate, mitigate, alleviate, solve, or otherwise avoid failures to a service operation as a result of an infrastructure failure. For example, in various embodiments, mitigation actions may involve redirecting, rerouting or reorganizing the placement or operation of resources in a data center. For instance, client requests or new data may be placed in unaffected locations, instead of locations that may be possibly about to undergo a failure event. Mitigation actions may be performed to alleviate the impact of service operations or resources in affected areas, transferring data, making replicas of data, or saving application state to persistent storage. In some embodiments, no mitigation action may be performed after determining that the risk to the affected area is not worth the cost of the mitigation action, or is already dampened by other mitigation techniques already in place for the resource (e.g., consistency mechanisms, such as quorum schemes, or redundancy policies). In some embodiments, a recommended mitigation action may be included in the prediction of the infrastructure failure event for consideration.

Different techniques may be performed to evaluate and select the mitigation action (or actions) to perform. For example, the received information about the event may be evaluated according to various rule-based or knowledge-based schemes. For instance, different sets of rules and mitigation actions may be stored for each event type. The appropriate set of rules may be retrieved for the failure event and evaluated according to the identified rules and mitigation actions. For example, the various rules may indicate which features are determinative in the provided information (e.g., probability and affected devices) and which features are not (e.g., time to fail). In some embodiments, the predication may include a recommended mitigation action which may be evaluated or ignored. FIG. 8, discussed below, provides an example of evaluating the potential mitigation actions according to probability thresholds. Similarly, estimated time thresholds may be applied to predicted infrastructure failure events. In some embodiments, default mitigation actions may always be applied for an event, whereas for other events, a selection among multiple mitigation actions may be performed. Based on the evaluation, a mitigation action may be selected, as indicated at 840 (e.g., according to the retrieved selection rules for the type of event). The mitigation action may then be performed, as indicated at 850. Mitigation actions in provider networks may, in some embodiments, span actions taking place across data centers (e.g., by transferring data or operations from one data center to another), in some embodiments. As indicated at 860, the mitigation action may be reported, in some embodiments, to a monitoring system that provided the infrastructure failure event prediction.

In some embodiments, a minimum response threshold may be implemented such that a probability of occurrence or estimated time must exceed the minimum response threshold in order for a mitigation action to be performed. For example, if the threshold says that events with probabilities less than 30%, then as indicated by the negative exit from 830, the response may be delayed, as indicated at 870, until probability is greater than 30% or a response may not be performed at all.

In at least some embodiments, upon detecting the end of the failure event (e.g., a repair or reboot of resources) or detecting that the failure event did not occur, the mitigation action may be undone. For instance, if requests are directed away from affected infrastructure, then the requests may be allowed to be directed to the affected infrastructure again. In this way, a service may automatically respond to the changes wrought by infrastructure failure events and the subsequent repair actions.

Figure 9:
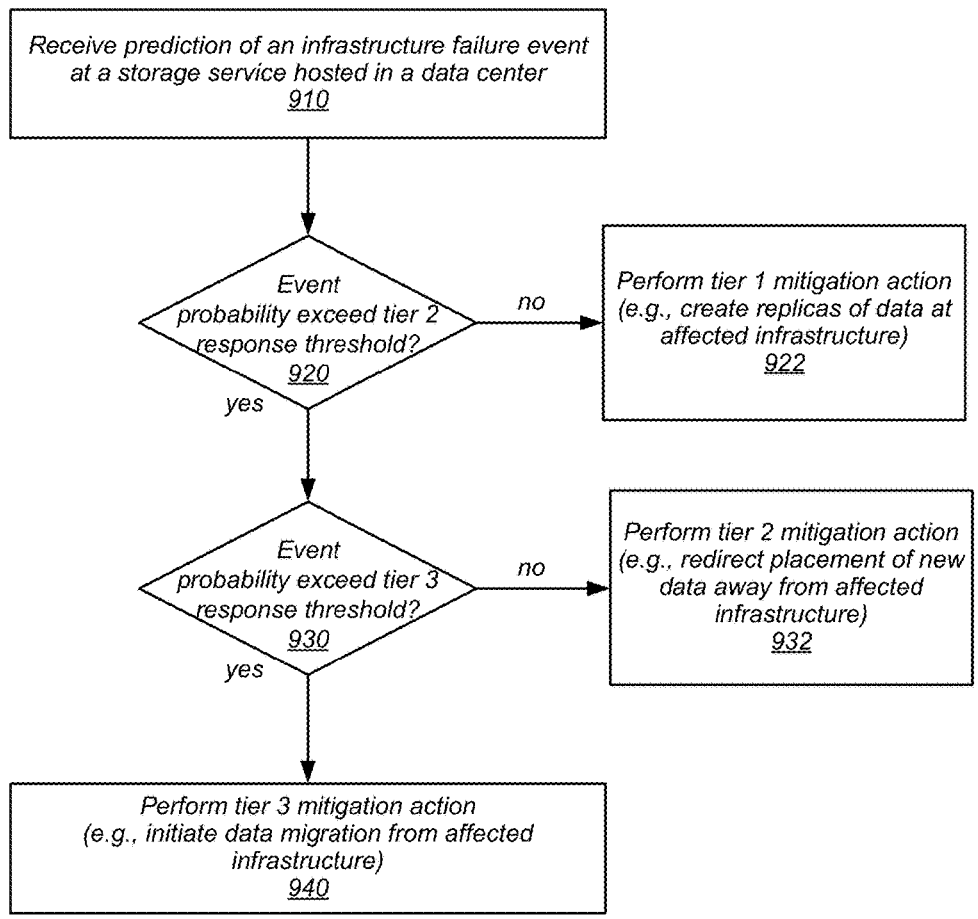
FIG. 9 is a high-level flowchart illustrating various methods and techniques for selecting mitigation actions, according to some embodiments.

Some services may handle responsive actions depending on the probability of occurrence for the predicted event. A storage service may provide an example of mitigation action selection which may be applied by other services as well. FIG. 9 is a high-level flowchart illustrating various methods and techniques for selecting mitigation actions, according to some embodiments. As indicated at 910, a prediction of a failure event may be received at a storage service hosted in a data center. The prediction may include an indication of a probability of occurrence for the failure event (e.g., a percentage, like 80%). Different probability thresholds may be implemented to provide a tiered decision for mitigation actions.

For instance, a probability threshold for tier 2 may be compared with the indicated probability of occurrence. If the threshold is not exceed, as indicated by the negative exit from 920 (e.g., probability <45%), then a tier 1 mitigation action may be performed. A tier 1 mitigation action may be a least costly mitigation action. For example, it may be least costly for a storage service to created replicas of data stored in areas affected by the failure event, so the mitigation action may be to create replicas of the data in unaffected areas. One or more other probability tiers may be implemented, in some embodiments, allowing a service to fine tune mitigation actions performed in response to a failure event. For instance, a probability that exceeds a tier 2 threshold, at 920, but not a tier threshold, at 930, may perform a tier 2 mitigating action. A tier 2 mitigation action may be more costly than tier 1, but less costly than tier 3. In the case of the storage service, the action may be to redirect storing new data away from affected infrastructure. If the tier 3 threshold is exceed (e.g., >70%), then a tier 3 mitigation action may be performed. For instance, data may be migrated from the affected infrastructure in the storage service. Please note that the previous examples for the number of tiers and number or types mitigation actions are not intended to be limiting.

The methods described herein may in various embodiments be implemented by any combination of hardware and software. For example, in one embodiment, the methods may be implemented by a computer system (e.g., a computer system as in FIG. 10) that includes one or more processors executing program instructions stored on a computer-readable storage medium coupled to the processors. The program instructions may be configured to implement the functionality described herein (e.g., the functionality of various servers, resource hosts, control planes, managers and/or other components, such as those that implement the block-based storage service described herein). The various methods as illustrated in the figures and described herein represent example embodiments of methods. The order of any method may be changed, and various elements may be added, reordered, combined, omitted, modified, etc.

Figure 10:
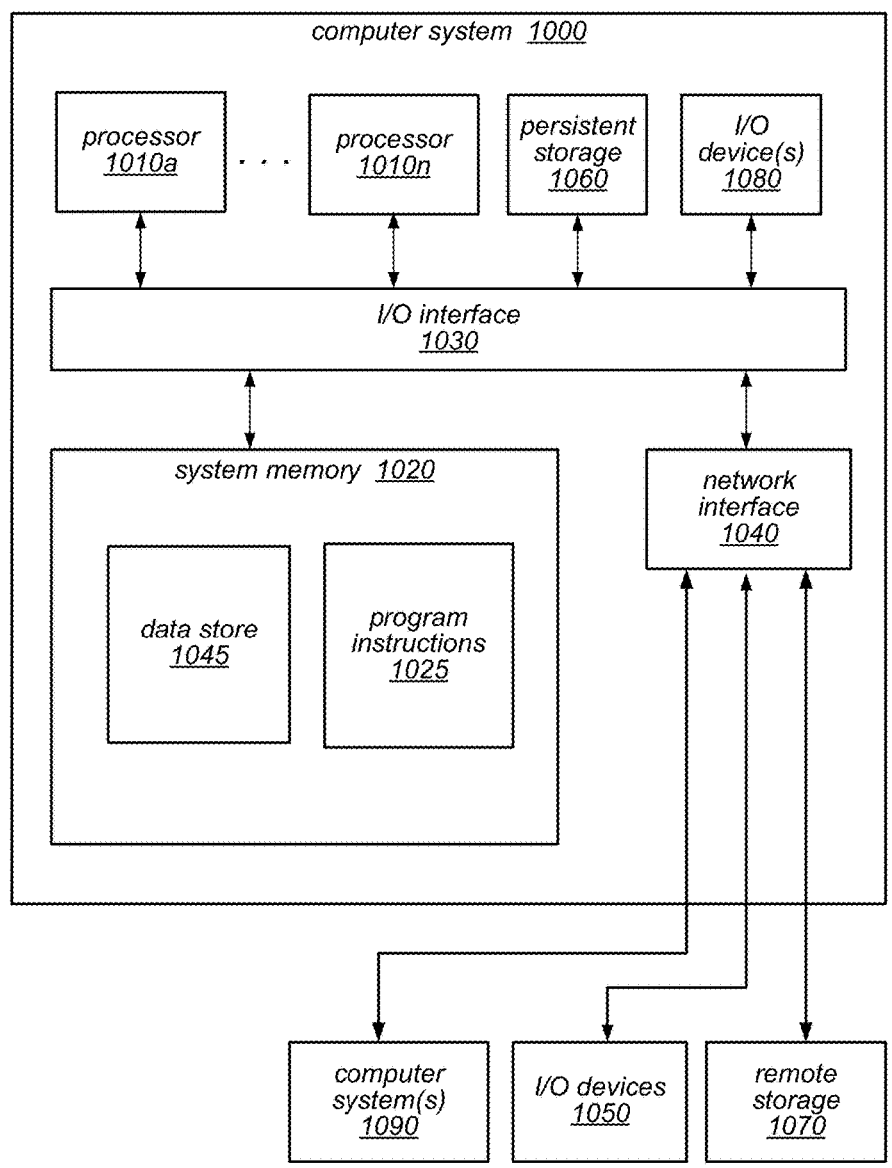
FIG. 10 is a block diagram illustrating an example computing system, according to some embodiments.

Embodiments of predicting infrastructure failure events for hosted server mitigation actions as described herein may be executed on one or more computer systems, which may interact with various other devices. FIG. 10 is a block diagram illustrating an example computer system, according to various embodiments. For example, computer system 1000 may be configured to implement storage and/or compute nodes of a compute cluster, a data stores, and/or a client, in different embodiments. Computer system 1000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 1000 includes one or more processors 1010 (any of which may include multiple cores, which may be single or multi-threaded) coupled to a system memory 1020 via an input/output (I/O) interface 1030. Computer system 1000 further includes a network interface 1040 coupled to I/O interface 1030. In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA. The computer system 1000 also includes one or more network communication devices (e.g., network interface 1040) for communicating with other systems and/or components over a communications network (e.g. Internet, LAN, etc.).

In the illustrated embodiment, computer system 1000 also includes one or more persistent storage devices 1060 and/or one or more I/O devices 1080. In various embodiments, persistent storage devices 1060 may correspond to disk drives, tape drives, solid state memory, other mass storage devices, block-based storage devices, or any other persistent storage device. Computer system 1000 (or a distributed application or operating system operating thereon) may store instructions and/or data in persistent storage devices 1060, as desired, and may retrieve the stored instruction and/or data as needed. For example, in some embodiments, computer system 1000 may host a storage system server node, and persistent storage 1060 may include the SSDs attached to that server node.

Computer system 1000 includes one or more system memories 1020 that are configured to store instructions and data accessible by processor(s) 1010. In various embodiments, system memories 1020 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 1020 may contain program instructions 1025 that are executable by processor(s) 1010 to implement the methods and techniques described herein. In various embodiments, program instructions 1025 may be encoded in platform native binary, any interpreted language such as Java™ byte-code, or in any other language such as C/C++, Java™, etc., or in any combination thereof. For example, in the illustrated embodiment, program instructions 1025 include program instructions executable to implement the functionality of a infrastructure analysis and monitoring system, in different embodiments. In some embodiments, program instructions 1025 may implement multiple separate clients, nodes, and/or other components.

In some embodiments, program instructions 1025 may include instructions executable to implement an operating system (not shown), which may be any of various operating systems, such as UNIX, LINUX, Solaris™, MacOS™, Windows™, etc. Any or all of program instructions 1025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 1000 via I/O interface 1030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 1000 as system memory 1020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 1040.

In some embodiments, system memory 1020 may include data store 1045, which may be configured as described herein. In general, system memory 1020 (e.g., data store 1045 within system memory 1020), persistent storage 1060, and/or remote storage 1070 may store data blocks, replicas of data blocks, metadata associated with data blocks and/or their state, configuration information, and/or any other information usable in implementing the methods and techniques described herein.

In one embodiment, I/O interface 1030 may be configured to coordinate I/O traffic between processor 1010, system memory 1020 and any peripheral devices in the system, including through network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments, some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems 1090, for example. In addition, network interface 1040 may be configured to allow communication between computer system 1000 and various I/O devices 1050 and/or remote storage 1070. Input/output devices 1050 may, in some embodiments, include one or more display terminals, keyboards, keypads, touchpads, scanning devices, voice or optical recognition devices, or any other devices suitable for entering or retrieving data by one or more computer systems 1000. Multiple input/output devices 1050 may be present in computer system 1000 or may be distributed on various nodes of a distributed system that includes computer system 1000. In some embodiments, similar input/output devices may be separate from computer system 1000 and may interact with one or more nodes of a distributed system that includes computer system 1000 through a wired or wireless connection, such as over network interface 1040. Network interface 1040 may commonly support one or more wireless networking protocols (e.g., Wi-Fi/IEEE 802.11, or another wireless networking standard). However, in various embodiments, network interface 1040 may support communication via any suitable wired or wireless general data networks, such as other types of Ethernet networks, for example. Additionally, network interface 1040 may support communication via telecommunications/telephony networks such as analog voice networks or digital fiber communications networks, via storage area networks such as Fibre Channel SANs, or via any other suitable type of network and/or protocol. In various embodiments, computer system 1000 may include more, fewer, or different components than those illustrated in FIG. 10 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, a compute cluster within a computing service may present computing and/or storage services and/or other types of services that employ the distributed computing systems described herein to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations, though In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A data center, comprising:
one or computing devices comprising one or more respective hardware processors and memory and configured to implement:
a plurality of infrastructure management systems, configured to manage a plurality of different types of infrastructure resources for the data center;
a plurality of services hosted using the infrastructure resources at the data center, wherein each of the plurality of services provides a different network-based service to clients remote to the data center; and an infrastructure monitor, configured to:
collect operational metrics from the infrastructure management systems for the plurality of different types of infrastructure resources;
generate one or more failure models from the operational metrics;
evaluate the one or more failure models to predict whether an infrastructure failure event is to occur at a future time; and
responsive to a prediction of an occurrence of the infrastructure failure event, send respective notifications of the predicted infrastructure failure event via a programmatic interface to at least some of the plurality of services;
each respective service of the plurality of services, configured to:
receive the respective notification of the predicted infrastructure failure event via the programmatic interface;
determine a respective mitigation action for the respective service; and
automatically perform the respective mitigation action responsive to receipt of the respective notification of the predicted infrastructure failure event to mitigate one or more consequences associated with occurrence of the predicted infrastructure failure event.

2. The data center of claim 1, wherein the infrastructure monitor is further configured to send a prior notification including a probability of occurrence of the predicted failure event via the programmatic interface to at least one of the services before the notification is sent;
wherein the at least one service is further configured to:
evaluate the probability of occurrence of the predicted infrastructure failure event; and
based on the evaluation, delay performing the mitigation action.

3. The data center of claim 1, wherein the respective notifications of the predicted infrastructure failure event indicate a probability of occurrence for the predicted infrastructure failure event, and wherein at least one of the services is further configured to:
evaluate the probability of occurrence for the predicted infrastructure failure event with respect to one or more probability thresholds to select, from among a plurality of mitigation actions, the mitigation action to perform.

4. The data center of claim 1, wherein the data center is one of a plurality of data centers implementing a provider network, wherein the plurality of services hosted at the data center are hosted across the plurality of data centers of the provider network, wherein the respective mitigation action is performed at the data center and at least one other data center hosting the at least one service.

5. A method, comprising:
performing, by one or more computing devices:
receiving a stream of operational metrics from a plurality of different infrastructure systems of a data center, wherein the data center hosts a plurality of different services using the infrastructure resources, wherein each of the plurality of services provides a different network-based service to clients remote to the data center;
generating one or more failure models from the stream of operational metrics for the plurality of different types of infrastructure resources;

evaluating the one or more failure models to predict whether an infrastructure failure event is to occur at a future time; and
responsive to a prediction of an occurrence of the infrastructure failure event, reporting the prediction of the infrastructure failure event via a programmatic interface to at least some of the services hosted at the data center for determination of respective mitigation actions for the respective services to take to mitigate one or more consequences associated with occurrence of the predicted infrastructure failure event.

6. The method of claim 5, further comprising:
determining a respective mitigation action to perform for the predicted infrastructure failure event, wherein the prediction of the infrastructure failure event reported to at least one of the plurality of services includes the respective mitigation action.

7. The method of claim 5, further comprising providing a notification of the predicted infrastructure failure event to one or more clients of the at least one service.

8. The method of claim 5, wherein reporting the prediction of the infrastructure failure event comprises identifying the at least one service as subscribed to a type of infrastructure failure event that includes the predicted failure event.

9. The method of claim 5, wherein the predicted infrastructure failure event indicates:
an environmental failure;
a power failure;
a networking failure; or
a hardware failure.

10. The method of claim 5, further comprising:
in response to receiving the prediction of the infrastructure failure event via the programmatic interface:
evaluating, at at least one service, the prediction of the infrastructure failure event with respect to one or more service mitigation actions; and
based, at least in part, on the evaluation, selecting the mitigation action from the one or more service mitigation actions for the predicted infrastructure failure event.

11. The method of claim of claim 10, wherein the receiving the stream of operational metrics, the generating the one or more failure models, the evaluating the failure models, and the reporting the prediction are performed by an infrastructure monitor for the data center and wherein the method further comprises:
sending, by the at least one service, response data indicating the selected mitigation action; and
updating, by the infrastructure monitor, the one or more failure models according to the response data.

12. The method of claim 10, further comprising:
upon determining that the predicted infrastructure failure event has not occurred, undoing the selected mitigation action.

13. The method of claim 10, wherein the data center is one of a plurality of data centers implementing a provider network, wherein the plurality of services hosted at the data center are hosted across the plurality of data centers of the provider network, wherein the selected mitigation action is performed at the data center and at least one other data center hosting the at least one service.

14. A non-transitory, computer-readable storage medium, storing program instructions that when executed by one or more computing devices cause the one or more computing devices to implement:

receiving, at a service hosted in one or more data centers using infrastructure resources of the one or more data centers, a prediction of an infrastructure failure event to occur at a future time, via a programmatic interface, wherein the service provides a network-based service to clients remote to the one or more data centers;

evaluating, at the service, the prediction of the infrastructure failure event to determine whether to perform a mitigation action;

based, at least in part, on the evaluation, selecting by the service, the mitigation action for the predicted infrastructure failure event; and performing, at the service, the selected mitigation action to mitigate one or more consequences associated with occurrence of the predicted infrastructure failure event.

15. The non-transitory, computer-readable storage medium of claim 14, wherein the predicted infrastructure failure event indicates a probability of occurrence for the predicted infrastructure failure event and wherein, in evaluating, at the service, the prediction of the infrastructure failure event, the program instructions cause the one or more computing devices to implement:

comparing the probability of occurrence to a plurality of probability thresholds, wherein the mitigation action is selected according to a determination that the probability of occurrence is exceeds a probability threshold corresponding to the migration action.

16. The non-transitory, computer-readable storage medium of claim 14, wherein the program instructions cause the one or more computing devices to further implement providing a notification of the predicated failure event to one or more clients of the service.

17. The non-transitory, computer-readable storage medium of claim 16, wherein the notification to the one or more clients of the service is provided via a graphical user interface.

18. The non-transitory, computer-readable storage medium of claim 14, wherein the program instructions cause the one or more computing devices to further implement:

prior to receiving the prediction of the infrastructure failure event:

receiving another prediction of the same infrastructure failure event including a probability of occurrence of the infrastructure failure event, wherein the selected mitigation action is not performed in response to receiving the other prediction.

19. The non-transitory, computer-readable storage medium of claim 14, wherein the program instructions cause the one or more computing devices to further implement:

prior to receiving the prediction of the infrastructure failure:

receiving, at an infrastructure monitor, a stream of operational metrics from a plurality of different infrastructure systems of the one or more data centers, wherein the one or more data centers host a plurality of different services including the service;

generating, by the infrastructure monitor, one or more failure models from the stream of operational metrics;

evaluating, by the infrastructure monitor, the failure models to predict the infrastructure failure event; and reporting, by the infrastructure monitor, the prediction of the infrastructure failure event via the programmatic interface to the service.

20. The non-transitory, computer-readable storage medium of claim 19, wherein the program instructions cause the one or more computing devices to further implement sending, by the service, response data indicating the selected mitigation action to the infrastructure monitor.

* * * * *